United States Patent [19]

Aakenus et al.

[11] 4,363,316
[45] Dec. 14, 1982

[54] VESSEL FOR FOOD PREPARATION

[75] Inventors: Tiina Aakenus, Vantaa; Pekka Mertanen; Reijo Peltonen, both of Helsinki, all of Finland

[73] Assignee: Oy Wartsila AB, Helsinki, Finland

[21] Appl. No.: 217,916

[22] Filed: Dec. 18, 1980

Related U.S. Application Data

[63] Continuation of Ser. No. 953,458, Oct. 23, 1978, abandoned.

[30] Foreign Application Priority Data

Nov. 11, 1977 [FI] Finland .................................. 773277

[51] Int. Cl.³ .............................................. A47J 27/00
[52] U.S. Cl. ..................................... 126/390; 220/454
[58] Field of Search .................. 126/390, 389; 220/68, 220/445, 454, 456

[56] References Cited

U.S. PATENT DOCUMENTS

| | | | |
|---|---|---|---|
| 1,076,167 | 10/1913 | Smith | 126/390 |
| 1,502,843 | 7/1924 | Berger | 126/390 |
| 2,040,102 | 5/1936 | Peron | 126/390 |
| 2,151,535 | 3/1939 | Scurlock | 126/390 |
| 2,170,880 | 8/1939 | Wagner | 126/390 |
| 2,315,475 | 3/1943 | Cobb et al. | 126/390 |
| 3,788,513 | 1/1974 | Racz | 220/64 |

FOREIGN PATENT DOCUMENTS 810738 3/1937 France ................................ 126/390

Primary Examiner—Samuel Scott
Assistant Examiner—Randall L. Green
Attorney, Agent, or Firm—McAulay, Fields, Fisher, Goldstein & Nissen

[57] ABSTRACT

A vessel for food preparation having a bottom made of two different members, one of which is the actual bottom of the vessel and the other a separate bottom plate which is attached to the bottom of the vessel by means of several spaced-apart spot-formed or generally small-area attachment points. When the vessel is heated there will initially be a considerable temperature difference between the two layers of the bottom construction, which will give rise to small buckles in the separate bottom plate between its attachment points. Inside these buckles the air slot between the two layers of the bottom construction grows and this slows down the heat transmission to the inner surface of the vessel.

12 Claims, 3 Drawing Figures

VESSEL FOR FOOD PREPARATION

This application is a continuation of application Ser. No. 953,458 filed Oct. 23, 1978 and abandoned.

BACKGROUND OF THE INVENTION

1. Field of the Invention

The invention relates to a vessel for food preparation having a bottom made of two different plate members or the like.

2. Description of the Prior Art

In developing vessels for food preparation the aim has been already for a long time that the heat developed by a heat source below the vessel should be equalized in the bottom of the vessel so that at the inside bottom surface of the vessel threshold not occur local hotspots causing the food to get burnt adhere to the bottom of the vessel. Generally, the solution has been tried to find in using a thick bottom or a bottom material with generally good thermal conductivity, presuming that the good thermal conductivity of the bottom material would be able to equalize local hotspots with sufficient effectivity. As an example of this kind of known solutions mention could be made of the firm attachment, usually by means of soldering, of an outer copper bottom to the bottom of a stainless steel saucepan. However, practice has shown that the development has been on the wrong track, because it has not been possible by these means to solve satisfactorily the problem in question.

SUMMARY OF THE INVENTION

An object of the invention is to solve the problem mentioned above in quite a new way using instead of materials with a good thermal conductivity layers or portions slowing down the heat propagation. The invention is characterized in that the bottom construction of the vessel is formed of the actual bottom portion of the vessel and of an outer, separate bottom plate attached thereto by means of several spot-formed or generally small-area attachment point. The advantages of this construction are based on two different phenomena. Firstly, the temperature of the outside separate bottom plate rises faster than the temperature of the actual bottom portion of the vessel, because the outer bottom plate is in direct contact with the hot base and the bottom portion of the vessel is cooled by the material to be heated present in the vessel. As a consequence there will be a considerable temperature difference between the two layers of the bottom construction, due to which the outside bottom plate expands more than the bottom portion of the vessel. The result is that small buckles are formed in the outer bottom plate between its attachment points and inside these buckles the air gap between the two layers of the bottom construction grows. This occurs in a critical phase exactly when the desired temperature is reached inside the vessel. At that moment the electric hotplate or the like under the vessel is almost always far too hot. The growing insulating air gap occurring at several portions slows down the heat transmission to the inner surface of the vessel during this critical phase. This influence can be made more effective by making the outer bottom plate of a material having a greater coefficient of thermal expansion than the bottom portion of the vessel.

A bottom construction according to the invention is also advantageous because of the fact that two uniform surfaces being close together are in reality in direct contact with each other only at some spots with a very small area, and this in spite of the macrogeometric uniformity of the two surfaces facing each other. This is due to the fact that there are plenty of microgeometric differences in the surfaces, for instance, due to the coarseness of the surfaces, or due to small production errors. The rear contact surface does not generally form even 1% of the theoretical contact surface. Between the contact spots, a so called microgap is formed where the surfaces facing each other are very close, but nevertheless not in mechanical contact with each other, and this microgap is used in a bottom construction according to the invention as a layer slowing down the heat propagation. The spot-formed or small-area contact or attachment points of the bottom plate have such a small area that they do not noticeably change the nature of the microgap bottom construction. The contract points conduct heat from the bottom plate to the bottom portion of the vessel and across the microgap heat is transmitted basically by means of radiation. In spite of the microgap the heating of the vessel takes part basically as fast as in a conventional food preparation vessel. Hence, the efficiency of the bottom construction as a heat transmitting member is not essentially reduced.

The separate bottom plate can with advantage be attached by means of spot welding, or alternatively, for instance, by projection welding. Also other attachment methods are feasible, for instance, spot-formed or generally small soldering or welding spots can be used, but as a manufacture process spot or projection welding is usually the most favourable attachment method.

Due to the construction of generally used electric hotplates the separate bottom plate of a vessel according to the invention can with advantage be annular. The most favourable dimensions of an annular bottom plate vary in dependence of what kind of hot base is to be used. However, generally the best results are obtained with an annular bottom plate having a central opening with a diameter of about half the outer diameter of the plate.

The invention can be generally applied to food preparation vessels made of metal, for instance of aluminium or stainless steel, but nevertheless, the advantages of the invention are most prominent when the invention is applied to enamelled vessels. This is due to the fact that at the bottom of an enamelled vessel, a thin layer of so called dust enamel is used which has favourable properties as an effectively heat radiation receiving surface, and this gives a very favourable result in a vessel according to the invention. The dust enamel layer should preferably be dull and dark, with advantage black.

In the following, the invention will be explained more in detail with reference to the attached drawings, in which

DESCRIPTION OF THE PREFERRED EMBODIMENT

Figure 1:
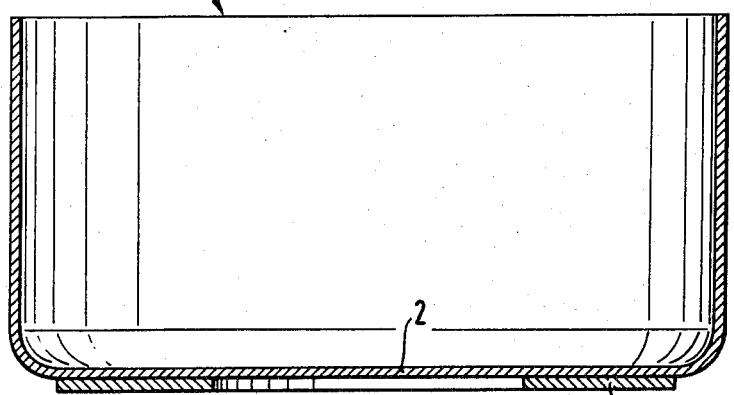
FIG. 1 shows a cross section of a food preparation vessel according to the invention.
Figure 2:
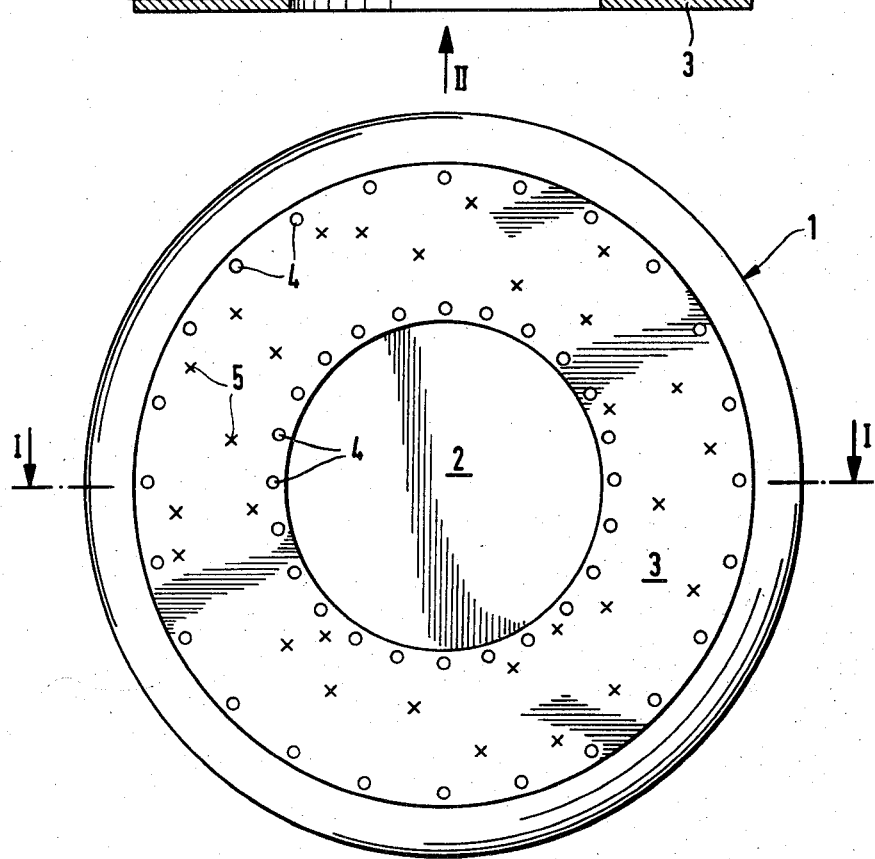
FIG. 2 shows the vessel of FIG. 1 as seen from below.
Figure 3:
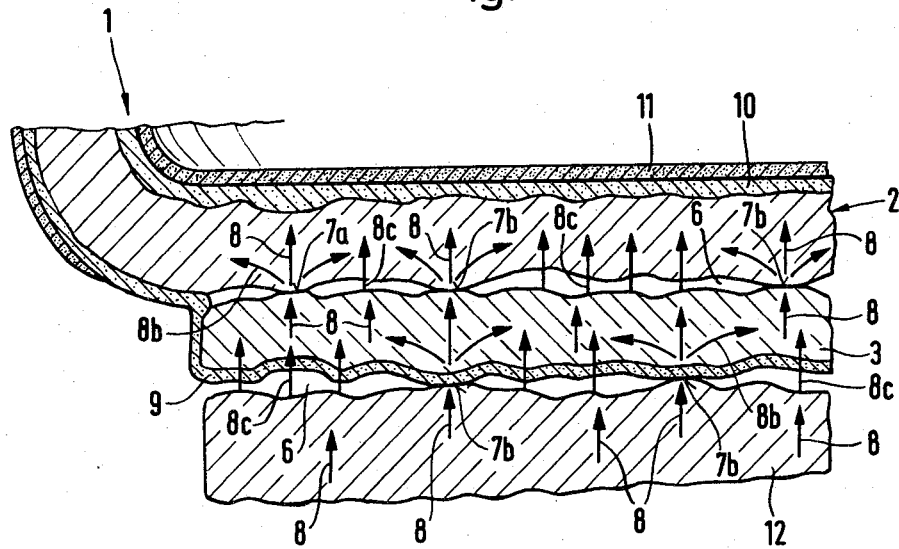
FIG. 3 shows on an enlarged scale the heat progress from the hot base through the separate bottom plate to the actual bottom portion of the vessel.

In the drawings, the numeral 1 indicates a vessel for food preparation, 2 the bottom portion of the actual vessel and 3 a separate bottom plate attached to the bottom portion 2. The bottom plate 3 is attached to the bottom portion 2 of the vessel by means of several small-area attachments, for instance, by means of spot welding attachments 4 (FIG. 2). Between the real attachment points there are a plurality of random distributed contact points 5, but in other respects there is a so called microgap between the bottom plate 3 and the bottom portion 2 of the vessel. In FIG. 3 there is more clearly shown how the heat propagates through the attachment and the contact points and across the microgap. In FIG. 3, the upper metal layer 2 is the bottom portion of the vessel and the lower metal layer 3 is a separate annular bottom plate attached to the portion 2, which plate may be of a material having a greater coefficient of thermal expansion than the bottom portion 2. A good combination is, for instance, a bottom plate of stainless steel and a vessel of normal steel. Between the two parts, there is a microgap 6 and a plurality of contact points 7a and 7b of which, for instance, the points 7a can be attachment points made by welding. The attachment points 7a and the other contact points 7b are very little different as far as their heat leading qualities are concerned. As FIG. 3 shows, the heat, indicated by arrows 8, propagates directly through the contact points 7a and 7b from the layer 3 to the layer 2 where the heat due to the thermal conductivity of the layer 2 spreads also sideways (arrow 8b). Simultaneously heat is transmitted by radiation across the microgap 6 (arrows 8c) due to which the heat distribution in layer 2 will be substantially uniform. Below the layer 3 there is a hot surface, for instance, an electric hotplate 12 or the like and the heat transmission between this space and the bottom plate 3 is basically of the same kind as the heat transmission between the layers 2 and 3.

The achievement of a uniform heat distribution at the inner surface of the vessel is essentially dependent on the fact that the greater part of the heat is transmitted by radiation across the micrgap. The total area of the real contact points is extremely small, and in addition, the contact points between the hot base 12 and the bottom plate 3 are only extremely rarely at the same position as a contact point between the bottom plate 3 and the bottom portion 2 of the vessel, whereby the heat transmitted by thermal conduction generally has to pass a long distance.

A bottom surface coated with dust enamel 9 effectuates the radiation heat transmission. Due to this, a vessel bottom coated with dust enamel is more favourable and gives a better result in a vessel according to the invention than, for instance, a bottom covered with copper, because copper is a good conductor of heat, but a poor receiver of heat radiation.

In FIG. 3, there is also shown the base enamel 10 and the surface enamel 11 of the inside of an enamelled vessel.

The invention is not limited to the embodiment shown, but several modifications of the invention are feasible within the scope of the attached claims.

We claim:

1. A vessel for food preparation having a side wall structure and a bottom, said bottom comprising:
    two plate members;
    a first of said two plate members forming an inner portion integral with said side wall structure and having an outer portion with a uniform surface;
    a second of said two plate members which is a separate member and has a surface facing the outer portion of said first plate member and being uniform therewith, said second plate member being rigidly attached to an in contact with the uniform surface of said first plate member;
    several spaced-apart small-area attachment points for rigidly attaching said first plate member to said second plate member, said spaced-apart small-area attachment points having therebetween, at least in one direction along the mutual contact surfaces of said two plate members, an area of considerable length being free of attachment points between said two plate members; and
    the thickness of said second plate member and the distance between said attachment points being related so as to allow buckling of said second plate member due to thermal expansion thereof, thereby introducing an air gap between said two plate members.

2. A vessel as claimed in claim 1, wherein said second plate member is attached to said first plate member by means of spot welding.

3. A vessel as claimed in claim 1 or 2, wherein said second plate member is made of a material having a greater coefficient of thermal expansion than said first plate member.

4. A vessel as claimed in claim 1, wherein said second plate member is attached to said first plate member by means of projection welding.

5. A vessel as claimed in claim 1, wherein said second plate member is annular.

6. A method of making a vessel of the kind claimed in claim 1 or 5, comprising the steps of:
    attaching a separate outer bottom plate to a vessel body of steel by means of spot-forming welding joints, and
    enamelling said vessel all over including said bottom plate after said attachment operation to form an enamelled steel vessel with a dark dust-enamel covered outer bottom surface on said bottom plate.

7. A vessel as claimed in claim 5, wherein said several spaced-apart small-area attachment points are close to the outer edge of said annular plate member.

8. A vessel as claimed in claim 1, wherein said second plate member is annualar and is provided with a central opening having a diameter of about half the outer diameter of said second plate member.

9. A vessel as claimed in claim 1 or 8, wherein the outer surface of said second plate member is enamelled with dust enamel.

10. A vessel a claimed in claim 8, wherein said several spaced-apart small-area attachment points includes one group close to the outer edge of said annular plate member and another group close to the inner edge surrounding said central opening of said annular plate member.

11. A vessel as claimed in claim 1, in which the surfaces of said first plate member and said second plate member facing each other are uniform when said first and said second plate members are in a cold condition and are designed to form said air gap when said vessel is heated, by introducing in said second plate member a greater degree of thermal expansion than in said first plate member due to a higher temperature caused therein by a hot base being in direct contact with said second plate member, whereas said first plate member is cooled by the material to be heated contained in said vessel.

12. A vessel as claimed in claim 1, wherein the outer surface of said bottom is enamelled with dust enamel.

* * * * *